United States Patent [19]
Gansert et al.

[11] 4,100,475
[45] Jul. 11, 1978

[54] BATTERY TEMPERATURE COMPENSATED BATTERY-CHARGING SYSTEM

[75] Inventors: Willi Gansert, Kornwestheim; Harry Slansky, Mühlacker, both of Germany

[73] Assignee: Robert Bosch GmbH, Stuttgart, Germany

[21] Appl. No.: 705,455

[22] Filed: Jul. 15, 1976

[30] Foreign Application Priority Data
Aug. 7, 1975 [DE] Fed. Rep. of Germany ....... 2535245

[51] Int. Cl.² ............................................. H02J 7/14
[52] U.S. Cl. ....................................... 320/35; 320/61; 320/64
[58] Field of Search ....................... 320/35, 36, 39, 40, 320/61, 64, 68; 322/28

[56] References Cited
U.S. PATENT DOCUMENTS

| | | | |
|---|---|---|---|
| 2,442,445 | 6/1948 | Toelle | 320/35 |
| 3,121,837 | 2/1964 | Holm et al. | 320/35 X |
| 3,123,758 | 3/1964 | Giacalone | 320/36 |
| 3,296,516 | 1/1967 | Paine et al. | 320/35 |
| 3,585,482 | 6/1971 | Zelina | 320/39 |

*Primary Examiner*—Robert J. Hickey
*Attorney, Agent, or Firm*—Flynn & Frishauf

[57] ABSTRACT

A temperature-sensitive portion of the circuit of a voltage regulator of a vehicular battery charging system is located in or on the battery for simultaneously sensing the battery voltage and the battery temperature so as to provide through a single additional connection the necessary information to the remainder of a voltage regulator which is mounted in the vehicle generator. The temperature-sensitive portion of the voltage regulator components, which may be constituted by a single resistor, can be located in a housing in the connection clamp to the ungrounded terminal of the battery, in the filling cap of a battery cell or in a cavity in the battery case.

10 Claims, 7 Drawing Figures

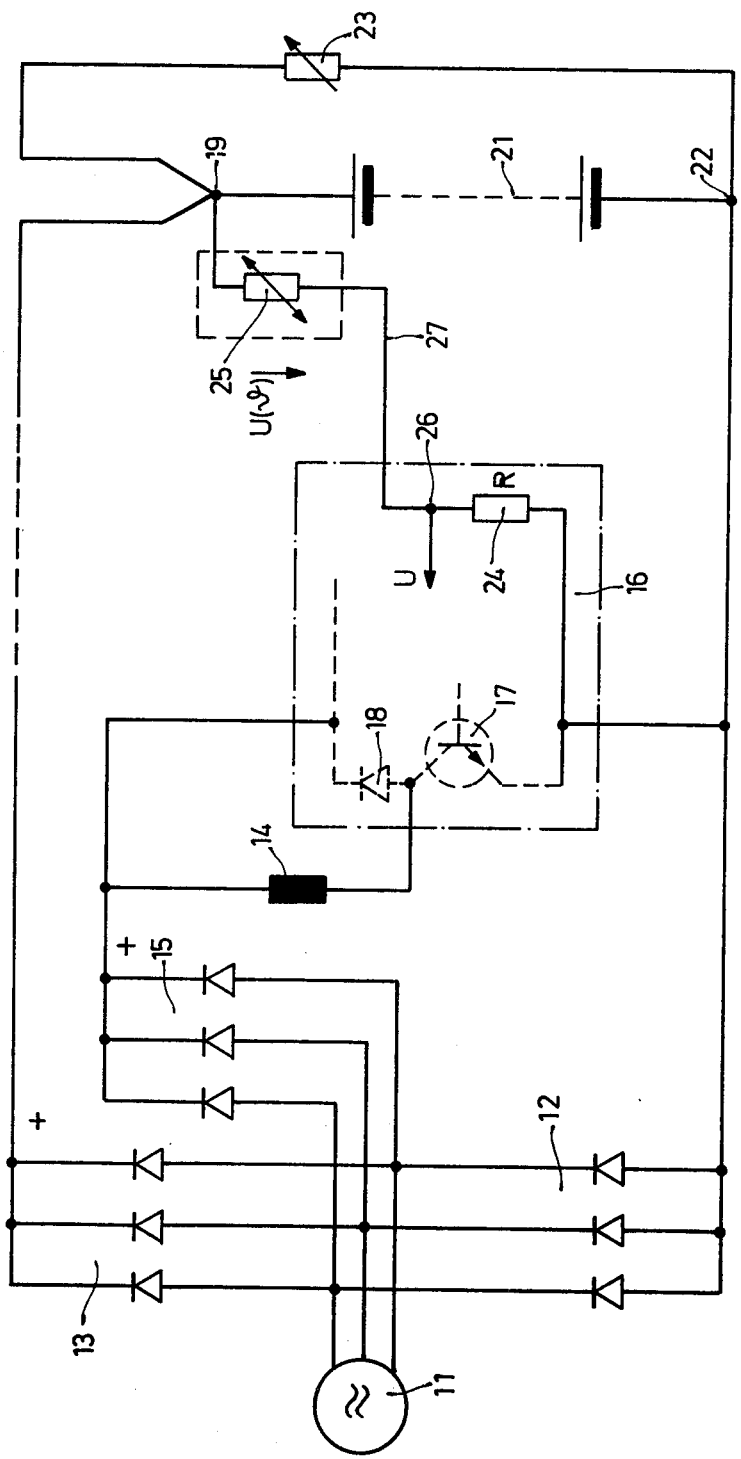

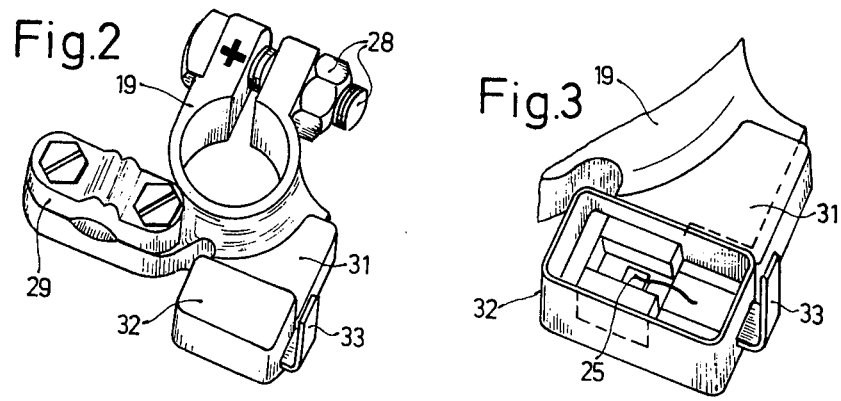
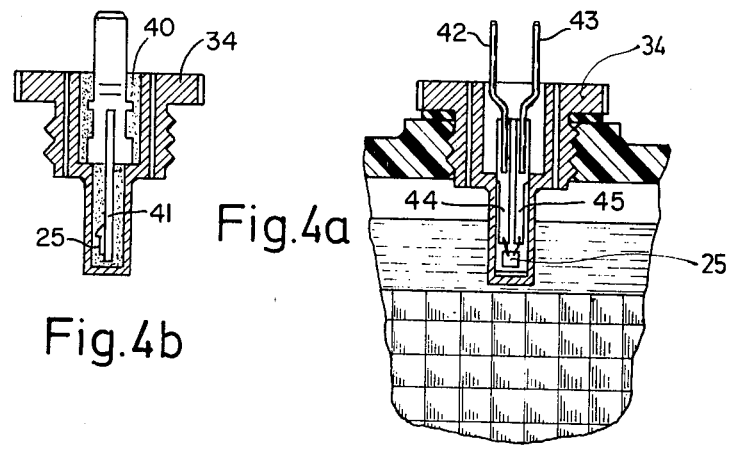
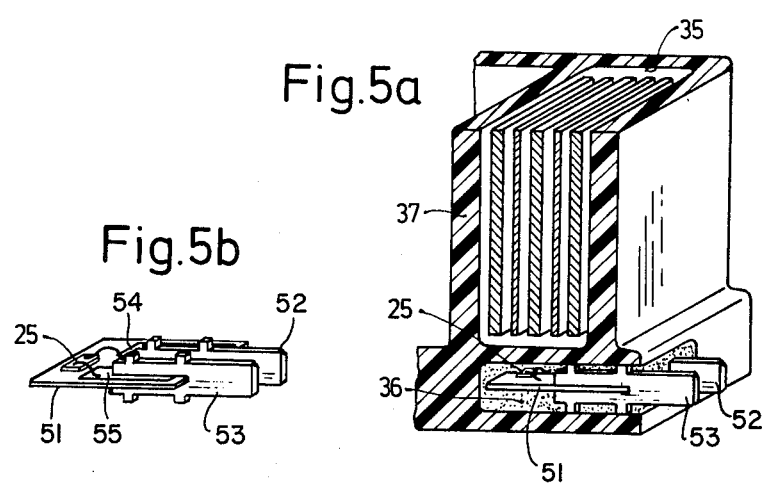

BATTERY TEMPERATURE COMPENSATED BATTERY-CHARGING SYSTEM

This invention relates to vehicular battery charging equipment including a temperature compensated voltage regulator connected between the battery and the excitation winding of the generator of a vehicle.

Circuits utilizing semiconductor devices are utilized in increasing quantities in voltage regulators of the electrical systems of motor vehicles. Such circuits contain no mechanically movable contacts and utilize such common semiconductor devices as diodes and transistors. This trend has produced voltage regulators of small mechanical dimensions. Because of their small size, these voltage regulators can generally be built into the generator.

It is advantageous to build the voltage regulator right into the generator because that saves expensive cabling, a separate mounting in the vehicle for the regulator and considerable labor both in construction and in service. Generators complete with built-in regulators, involving fewer components and fewer plug-in connections increase the reliability of the battery charging system.

The voltage regulator is intended to maintain the output voltage of a generator at a particular level, independently of variations in the load. In operation the generator has its own operating temperature which of course becomes the ambient temperature for the built-in voltage regulator. The regulator characteristic of the voltage regulator is of course influenced by the temperature within the generator and variations in the latter cause variations in the output voltage of the generator. A slight variation in voltage is of negligible consequence for most current consuming devices in the vehicle, such vehicle lamps, blinker circuits and so on. Slight variations in voltage resulting from changes in generator temperature, however, can damage the vehicle battery or negatively influence the charge level. The charging voltage of the vehicle battery should be dependent upon the charge condition and the temperature of the battery and not dependent on other factors, particularly not from the housing temperature of the generator. In spite of this principle, it is common to carry out voltage measurement and temperature sensing for inputs to the voltage regulator in the regulator casing itself, that is, to provide the voltage measurement by the use of the generator output voltage and the temperature measurement by a provision of suitable temperature sensitive components in the circuit of the voltage regulator. This compromise is tolerable for the majority of applications of the voltage regulator. In critical cases, however, for example when the connection between the generator and the battery has a relatively high resistance or must carry heavy current, measurement of voltage directly at the battery is necessary. For that purpose a supplementary connecting conductor is necessary. If in accordance with the above-mentioned requirements it should be necessary to bring the battery temperature into account in the operation of the voltage regulator, and that is necessary when the battery and the regulator are not placed in the same compartment, at least two additional conductors, hence three in all, must be provided. The provision of these extra connections is a disadvantage on account of the costs and the reliability risks of the cabling.

It is an object of the present invention to enable the battery voltage and temperature to be taken into account in the voltage regulator without the disadvantage of providing multiple additional connections between the battery and generator-mounted voltage-regulation equipment.

SUMMARY OF THE INVENTION

Briefly, the temperature-sensing portion of the regulator circuit is a two-terminal circuit portion located remotely from the remainder of the regulator and near the battery and inserted in the connection between the battery and the remainder of the voltage regulator. In one form of the invention it is built into the connection clamp for one of the terminals of the battery, preferably the ungrounded terminal. It is particularly convenient for this two-terminal portion to be one leg of the input voltage divider of the voltage regulator and to be constituted as a single negative temperature coefficient resistor or as a diode. In either case only a single additional connection between battery and generator-mounted components is necessary. The battery connection clamp carrying the temperature-sensing portion of the regulator may conveniently provide a casing or housing for the circuit component in question. In other forms of the invention the temperature-sensitive circuit portion can be mounted in one of the battery caps used for inserting or testing or inspecting the electrolyte, or in a small cavity or compartment provided in the battery case.

The invention can be adapted to providing any reasonably desired regulation characteristic. Even the provision of a knee or point of inflection in the regulation characteristic can be made possible in this way. Among the various embodiments of the invention that are practical, the provision of a temperature sensing element participating in the voltage measurement in a battery terminal clamp is particularly advantageous. In this case only a single additional part needs to be installed and such a part can readily be made commercially available. In this form the invention is readily compatible with the battery charging systems heretofore generally used.

BRIEF DESCRIPTION OF THE DRAWINGS

The invention is further described by way of example with reference to the accompanying drawings, in which:

FIG. 1 is an overall circuit diagram of a battery charging system according to the invention;

FIG. 2 is a perspective view of a battery terminal connection clamp, with a housing for a temperature-sensitive circuit component;

FIG. 3 is a detail of FIG. 2 on an enlarged scale showing the housing open;

FIG. 4a is a cross section of a battery cap in which a temperature-sensitive circuit component is located and of a portion of the battery in which the battery cap is seated;

FIG. 4b is a cross section of the battery cap of FIG. 4a in a median plane perpendicular to the plane of the drawing of FIG. 4a;

FIG. 5a is a perspective view partly in section of a battery case having a cavity in which a temperature-sensitive circuit component is inserted; and FIG. 5b is a perspective view of the temperature-sensitive circuit component and its insertion mount for use in the arrangement of FIG. 5a.

DESCRIPTION OF THE PREFERRED EMBODIMENTS

FIG. 1 shows a generator 11 connected to a bridge rectifier that is equipped with negative-side diodes 12 and positive-side diodes 13. An exciter winding 14 of the generator 11 is connected in a known way to the other circuits of the generator through the negative-side diodes 12 on the one hand and through the exciter diode 15 on the other. Whether the exciter winding 14 is switched into circuit or not is determined by the voltage regulator 16. The voltage regulator 16 has a final stage transistor 17 that operates as a switch, its switching path being connected in series with the exciter winding 14. A bypass diode 18 is provided to kill the reverse voltage peaks that occur from switching an inductive component such as the exciter winding 14. The positive battery terminal 19 of a battery 21 is connected to the cathodes of the positive-side diodes 13. Various useful loads, represented by the adjustable resistor symbol 23, are connected between the ungrounded positive battery terminal 19 and the grounded negative battery terminal 22.

The voltage regulator 16 has an input voltage divider composed of resistors 24 and 25. The resistor 24 is between the control connection 26 of the voltage regulator 16 and the ground connection 22, while the resistor 25 is connected between the control connection 26 and the positive terminal 19 of the battery 21. The resistor 25 is located at a distance from the remainder of the voltage regulator 16, in the neighborhood of the battery, and is connected to the control terminals 26 through a wire conductor 27.

FIGS. 2 and 3 show a first embodiment of an arrangement according to the invention for separately locating the resistor 25 in the neighborhood of the battery. FIG. 2 shows a battery connection clamp for the positive terminal 19 of the battery 21. A screw and nut combination 28 serves to clamp the connector 19 to the positive terminal of the battery and a second clamp 29 serves to clamp the connection cable that leads to the cathodes of the positive-side diodes 13. The novel feature of this device in accordance with the invention is an extension 31 that provides a housing 32 from which extends a connection plug device 33 for connecting the conductor 27. Of course instead of the plug 33, a connection socket could be provided for the same purpose.

FIG. 3 is a detail of FIG. 2 showing the housing 32 open at the top, with the resistor 25 visible in its place. The resistor 25 is in both electrical and thermal contact with the extension 31 and thereby with the positive connection clamp 19 of which that is a part. The free end of the resistor 25 is connected with the plug 33.

The circuit component 25 in this first embodiment of the invention can be a negative temperature coefficient resistor or a positive temperature coefficient resistor. This component, however, can instead also be a semiconductor, for example a Zener diode or a diode connected in its conducting direction with respect to the battery polarity, or even a transistor network or an integrated circuit. The particular nature of this circuit component 25, although it is shown as a resistor in FIG. 1, depends upon the nature of the temperature dependence characteristic of the voltage regulator that it is desired to provide with respect to the temperature of the battery 21.

As shown in other illustrated embodiments, the temperature sensor for the voltage regulator can also be mounted in the battery structure otherwise than in the connection clamp. As shown in FIG. 4a, the circuit component 25 can be mounted in one of the battery cell caps covering the aperture through which the battery electrolyte is filled tested and inspected. Since the battery cap is not immediately adjacent to the ungrounded battery terminal, it is necessary to bring out both terminals of the component 25, but of course ony one of them needs to be connected with the voltage regulator and the other one can be locally connected with the appropriate battery terminal. FIG. 4b is a cross section of a battery cap 34 at right angles to the cross section shown in FIG. 4a. In this view a filler material 40 is shown in the portion of the mounting cavity not occupied by the circuit component 25, its circuit board 41 and its terminals 42 and 43. The circuit connection paths 44 and 45 on the circuit board 41 are too thin to be shown edgewise in FIG. 4b.

FIG. 5a is a perspective view, partly in section, of a battery having a cavity 36 in the base of the battery case for insertion of a circuit component 25 mounted in a manner similar to the corresponding component of FIGS. 4a and 4b on a circuit board 51 on which are fastened terminal prongs 52 and 53 connected respectively to the terminal leads of the circuit components 25 through conducting foils 54 and 55. The cavity 36 is filled with a suitable filler material which should of course be an electric insulator but should provide thermal conduction so that the circuit element 25 will be at the temperature of the battery case. In the arrangement of FIGS. 4a and 4b, the filling 40 in a similar way helps to maintain the circuit component 25 at the temperature of the battery electrolyte.

The voltage regulator operates in a known way to switch the exciter winding 14 out of operation when the battery reaches a voltage that represents its fully charged condition, thus preventing further charging of the battery although the generator 11 continues to turn. The threshold voltage at which the final stage transistor 17 switches out the exciter winding 14, however, depends upon the battery temperature, just as the fully charged voltage of the battery depends on temperature. According to the temperature-voltage characteristics of the particular battery type the circuit component 25, typically a temperature-sensitive resistor, but possibly also a different type of component as already mentioned above, alters the proportion of the battery voltage that is applied to the control terminal 26 and does this in such a way as to compensate for the temperature effect, so that the switching threshold voltage of the voltage regulator 16 will be reached when the full charge voltage of the battery is reached at the positive battery terminal connection 19 for the particular battery temperature as sensed by the temperature-sensitive circuit component 25. Except for the temperature-sensitive component 25 and its single additional connecting cable 27, all of the voltage regulator 16 may be built into the housing of the generator 11 and only the conductor 27 need be added to the connections between the generator and the battery that are necessary for charging the battery. The operation of the voltage regulator is not substantially influenced by the voltage drop occurring in the cable between the positive-side diodes and the battery terminal connection 19, nor by the temperature within the generator housing 11. To the extent that the temperature within the generator housing 11 might have some secondary low-level influence, that can be separately compensated by known means, without interfering with the important provision according to the present invention for compensation of the voltage regulator for the battery temperature.

Although the invention has been described with respect to particular illustrative embodiments, it will be understood that modifications and variations are possible within the inventive concept.

We claim:

1. Vehicular battery charging equipment comprising, in combination with a battery.
   an electric generator having an excitation winding, and
   a temperature-sensitive voltage regulator connected to said excitation winding and to said battery and containing, in circuit as components thereof, active semiconductor switching devices and passive circuit components of which at least one has a temperature-sensitive function, said passive circuit components including diodes and resistors, said voltage regulator having a component having a temperature-sensitive function located apart and relatively remote from the remainder of said voltage regulator, said remote component having a temperature-sensitive function constituting a two-terminal circuit portion directly connected with the ungrounded terminal (19) of the battery (21), and in the connection (27) electrically connecting said terminal of the battery (21) with the remainder of the voltage regulator.

2. Equipment as defined in claim 1, in which said remotely located circuit component is mounted on or in a connection clamp (19) of the battery (21).

3. Equipment as defined in claim 1, in which said remotely located component (25) consists of one leg of a voltage divider (24, 25) provided for the input of the voltage regulator (16).

4. Equipment as defined in claim 3, in which the leg remotely located of said voltage divider (24, 25) is the leg (25) of said voltage divider connected between the ungrounded terminal of the battery and the control input (26) of the voltage regulator.

5. Equipment as defined in claim 3, in which said remotely located circuit component (25) consists of a negative temperature coefficient resistor.

6. Equipment as defined in claim 1, in which the remotely circuit component (25) consists of a diode.

7. Equipment as defined in claim 1, in which said battery has its negative terminal grounded to a vehicle chassis and has at least its positive terminal (21) connected in circuit by means of a terminal clamp (19) and in which said remotely located component (25) of the voltage regulator is mounted on or in said battery terminal clamp (19) for the positive terminal of the battery (21).

8. Equipment as defined in claim 7, in which said battery connection clamp for the positive battery terminal is provided with a housing for containing said temperature-sensitive component (25) having a function.

9. Equipment as defined in claim 1, in which said circuit component having a temperature-sensitive function is mounted within a removable cap (34) of a cell (35) of the battery (21) (FIG. 4).

10. Equipment as defined in claim 1, in which said battery (21) has a battery case (37) provided with a cavity (36) therein, in which cavity is located said circuit component (25) having a temperature-sensitive function.

* * * * *